United States Patent [19]
Toda et al.

[11] 4,379,615
[45] Apr. 12, 1983

[54] DEVICE FOR TRANSMITTING ENERGY THROUGH ELECTRIC WIRE OR OPTICAL CABLE WOUND ON DRUM

[75] Inventors: Yuichi Toda; Kohji Yano; Katsuji Sakamoto, all of Yokohama, Japan

[73] Assignee: Sumitomo Electric Industries, Ltd., Osaka, Japan

[21] Appl. No.: 176,609

[22] Filed: Aug. 8, 1980

[30] Foreign Application Priority Data

Aug. 20, 1979 [JP] Japan ............................ 54-104929
Aug. 20, 1979 [JP] Japan ............................ 54-104930

[51] Int. Cl.³ .................... G02B 5/14; G02B 5/172; H04B 9/00
[52] U.S. Cl. ................... 350/96.23; 350/96.16; 242/54 R
[58] Field of Search ............. 350/96.23, 96.16, 321, 350/96.2; 254/134.3 R, 134.3 SC; 367/117; 250/227; 340/850-859, 380; 375/36; 242/54 R; 455/600-619; 358/901; 191/12.2 R, 12.2 A

[56] References Cited
U.S. PATENT DOCUMENTS

3,873,039 3/1975 Harms et al. .................... 242/54 R
3,918,653 11/1975 Harms et al. .................... 242/54 R

*Primary Examiner*—Marvin L. Nussbaum
*Attorney, Agent, or Firm*—Sughrue, Mion, Zinn, Macpeak and Seas

[57] ABSTRACT

A device for transmitting signals or energy between a reel wound multi-core or multi-conductor cable and a stationary terminal unit without the use of a sliding connector. Dummy bobbins are provided coaxially with and rotatable with the winding reel with individual strands or conductors extending onto the winding surface thereof and wound thereupon. As the main cable is played out, the individual strands or wires are unwound from the dummy bobbins and then taken up by storage devices. In one embodiment, the storage devices are a second set of bobbins while in another embodiment the storage devices are constituted by stationary bundle receiving devices with pinch rollers provided for urging the individual strands or wires into the bundle receiving devices.

11 Claims, 15 Drawing Figures

DEVICE FOR TRANSMITTING ENERGY THROUGH ELECTRIC WIRE OR OPTICAL CABLE WOUND ON DRUM

BACKGROUND OF THE INVENTION

The present invention relates to an optical coupling device used for transmitting optical signals between a number of stationary terminal units and a movable element in which the number of stationary terminals units coupled through the optical fibers of an optical cable to the movable element can be increased as required.

Where signals are transmitted through a multi-core optical cable between a seabed sensor and a measuring instrument or a control unit on a ship, in playing out the optical cable connected between the seabed sensor and the measuring instrument or the control unit, it is necessary to vary the length of cable played out depending on the depth of water. Therefore, it is necessary that the optical cable container be so designed that the optical cable can be readily played out and wound in and the space occupied by the container be small. Accordingly, usually the optical cable is wound on a drum. However, in this case a problem arises in that it is rather difficult to satisfactorily couple the optical cable (including optical fibers) wound on the rotating drum to the measuring instrument or the control unit which are relatively stationary. In addition to this problem, there are inherent difficulties involved in connecting the optical fibers of the multi-core optical cable.

Figure 1:
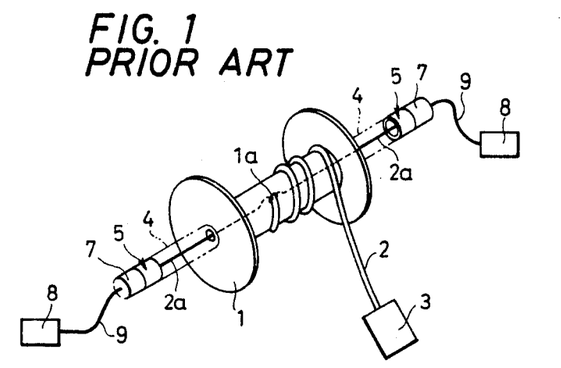
FIG. 1 is a schematic perspective view of a conventional optical coupling device.
Figure 2:
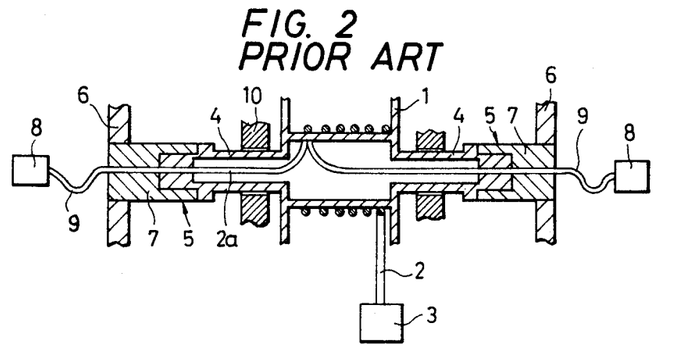
FIG. 2 is a cross-sectional view of the conventional optical coupling device.

An example of a conventional optical coupling device is shown in FIGS. 1 and 2. A two-core optical cable 12 is wound on a rotor 1 such as a drum. One end of the optical cable 2 is connected to a seabed sensor 3 while the other end of the optical cable 2 wound on the rotor 1 is inserted into a through-hole 1a formed in the winding barrel of the rotor 1. The rotor 1 is hollow. Hollow rotating shafts 4 extend from both ends of the hollow rotor 1. A rotary joint 5 is provided at the end of each rotating shaft 4. The rotary joint 5 includes the end portion of the rotating shaft 4 and a closed-end cylinder 7 which is fixedly secured to a stationary frame 6. The optical cable 2 inserted into the through-hole is branched into two optical fibers 2a inside the hollow rotor 1. The two optical fibers 2a pass through the rotating shafts 4 and are positioned at the ends of the rotating shafts 4 along the axes of the latter. One end of an optical fiber 9 is connected to a stationary terminal unit 8 and the other end is positioned on the axis of the cylinder 7 at the joint 5 on each side of the rotor 1. The optical fibers 9 are suitably coupled to the optical fibers 2a for signal transmission as the end portions of the rotating shafts 5 are maintained in axial alignment with the cylinders 7 in such a manner that the shafts are slightly spaced from or in contact with the cylinders. In FIGS. 1 and 2 reference numeral 10 designates bearings supporting the rotor 1.

The arrangement of the optical coupling device shown in FIGS. 1 and 2 is applicable to a two-core optical cable. However, it cannot be used with optical cables having more than two cores because the ends of corresponding fibers cannot then be kept in alignment.

The invention further relates to a device for transmitting electric signals, electric power or optical signals between an externally and stationarily disposed electrical device or optical device and an electric wire or optical cable wound on a rotary drum through a lead wire or cable without using a rotary slide contactor.

Figure 3:
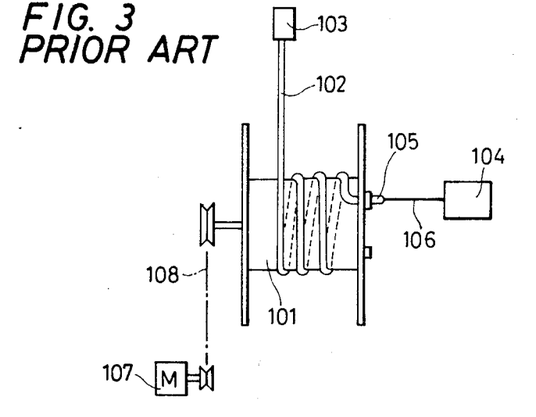
FIG. 3 is an explanatory illustration showing a conventional device for transmitting energy through a cable wound on a rotary drum disposed between a movable unit and a stationary unit.

FIG. 3 shows a conventional system of this type, in which electrical signals or the like are transmitted through a cable 102 wound on a drum between a movable electric unit 103 connected to the cable 102 and a main electric device 104 which is provided separately from the drum 101 while the cable 102 is played out or wound on the drum 102. In this case, generally a rotary slide contactor 105 such as a slip ring is interposed between the cable 102 on the rotating drum 101 and the stationary main electric device 104 so as to transmit electrical signals between the movable electric unit 102 and the main electric device 104.

However, the conventional system is disadvantageous in that the provision of the rotary slide contactor may generate noise, increase the circuit resistance, and make the electrical characteristics non-uniform. That is, it may result in various circuit losses. Accordingly, the conventional system is especially not suitable for high frequency signal transmission and it requires the provision of a special coupling system for optical communication.

In FIG. 3, reference numeral 106 designates a lead cable connecting the main electric device and the slide contactor, 107 a drum driving motor, and 108 a drum drive transmission device.

SUMMARY OF THE INVENTION

In view of the above-described drawbacks, an object of the invention is to provide an optical coupling device in which the rotor can be satisfactorily coupled to the stationary terminal units even with an optical cable having more than two cores.

The foregoing object and other objects of the invention have been achieved by the provision of an optical coupling device in which, according to the invention, a first end of an optical cable wound on a rotor is connected to a movable element, the second end of the optical cable is introduced into the rotor, optical fibers of the optical cable introduced into the rotor are connected to the other ends of dummy fibers which are wound on dummy bobbins mounted on the shaft of the rotor, the first ends of the dummy fibers are introduced into coupling bobbins which are mounted on shafts provided separately from the shaft of the rotor after the dummy fibers are partially wound on the coupling bobbins, the dummy fibers introduced into the coupling bobbins are positioned on the axes of bearings provided on the ends of the shafts of the coupling bobbins, and the first ends of optical fibers whose ends are connected to stationary terminal units are positioned on the axes of the bearings, respectively.

Further, according to a second embodiment of the present invention, in order to provide a coupling device capable of coupling great numbers of optical fibers while avoiding the use of a rotationally sliding contact at the coupling portion, the invention provides the following arrangement. That is, the above-noted object and other objects of the invention have been achieved by the provision of an optical coupling device which includes dummy bobbins mounted on the shaft of a rotor on which a multi-core optical cable is wound or provided. The first end of the optical cable is connected to a movable unit single-core or multi-core dummy fibers which are wound on the dummy bobbins and the second ends of the dummy fibers are coupled to the optical fibers in the optical cable. The first ends of the dummy fibers are connected to stationary terminal units. Bundle receiving devices are provided for the dummy bobbins for receiving the first end portions of the dummy fibers. Pinch rollers are interposed between the bundle receiving devices and the dummy bobbins to produce a tension on the dummy fibers to thereby pull the dummy fibers out of the dummy bobbins.

In the device for transmitting energy such as electrical or optical signals or electric power between an electric wire or cable wound on a drum and a unit provided separately from said drum, in order to avoid the drawbacks accompanying the above-mentioned slide-contactor, still another embodiment of the present invention is provided which includes a rotary reel connected directly to the drum so as to rotate with the drum, a lead cable connected to the unit provided separately from the drum and wound on the rotary reel, and lead cable storing means disposed between the reel and the unit for storing a part of the lead cable which is played out from the reel.

This object is also achieved by still another embodiment which includes a movable reel which is coaxially connected to the drum so as to rotate with said drum, a stationary reel which is provided coaxially with the movable reel, and an intermediate guide interposed between the flanges of the movable and stationary reels with the intermediate guide being rotated and driven along the flanges of the movable and stationary reels so that a lead cable connected between the cable wound on the drum and the unit provided separately from the drum is wound on the movable reel in one direction while the lead cable is wound on the stationary reel in the opposite direction.

It is to be understood that the invention is not limited in its application to the details of construction and arrangement of parts illustrated in the accompanying drawings since the invention is capable of other embodiments and of being practices or carried out in various way. Also it is to be understood that the phraseology or terminology employed herein is for the purpose of description and not of limitation.

DESCRIPTION OF THE PREFERRED EMBODIMENTS

A first preferred embodiment of the invention will be described with reference to FIGS. 4 and 5 in which those components which have been previously described with reference to FIGS. 1 and 2 are similarly numbered.

Figures 4, 5, 6:
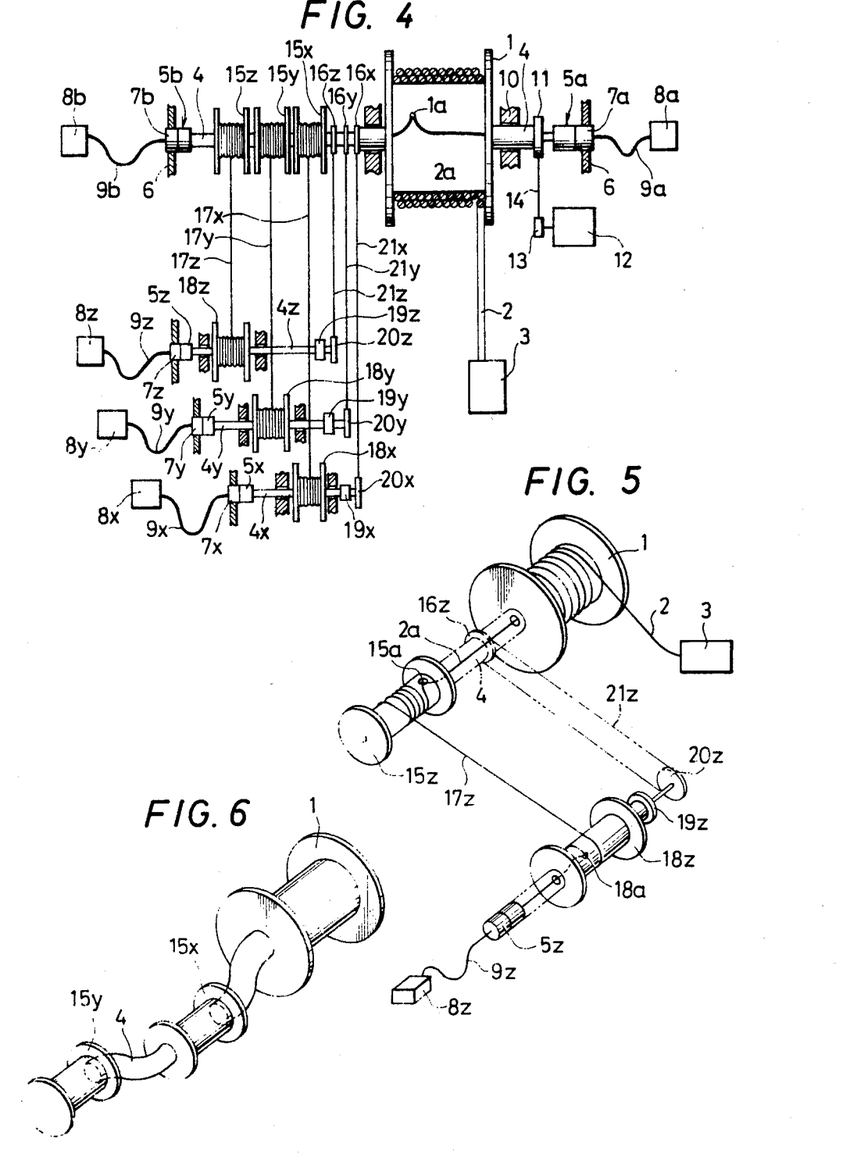
FIG. 4 is a schematic illustration showing an arrangement of an optical coupling device according to a first embodiment of the present invention.
FIG. 5 is a schematic perspective view showing a part of the device in FIG. 4.
FIG. 6 is a schematic perspective view showing a part of a modification of the optical coupling device according to the first embodiment of the present invention.

FIG. 4 shows an embodiment of an optical coupling device of the invention in which a five-core optical cable is employed. The five-core optical cable 2 is wound on a rotor 1 turned by two rotary shafts 4. The first end of the optical cable 2 is connected to a seabed sensor 3. The optical cable 2 is inserted through a through-hole 1a in the rotor 1 where it is branched into five optical fibers 2a. A first one of the five optical fibers 2a is coupled through a rotary joint 5a provided on the end of one of the rotary shafts 4 to an optical fiber 9a which extends to a stationary terminal unit 8a. A second optical fiber 2a is coupled through a rotary joint 5b provided on the end of the other rotary shaft 4 to an optical fiber 9b which extends to another stationary terminal unit 8b. As is illustrated in FIG. 4, the optical fibers 2a are coupled to the optical fibers 9a and 9b on the axes of the rotary joints 5a and 5b, respectively.

A driven pulley 11 is mounted on the rotary shaft 4. The driven pulley 11 is coupled through a drive belt 14 to a driving pulley 13 fixedly mounted on the shaft of an electric motor 12. The rotary shaft 4 and accordingly the rotor 1 are rotated by the motor 12 through the pulleys 11 and 13 and the drive belt 14.

Dummy bobbins 15x, 15y and 15z and pulleys 16x, 16y and 16z are fixedly mounted on the other rotary shaft 4 so that the dummy bobbin, pulleys and rotary shaft rotate as a unit. The remaining three optical fibers pass through through-holes 15a formed in the dummy bobbins 15x, 15y and 15z, respectively. Dummy optical fibers 17x, 17y and 17z are wound on the dummy bobbins 15, 15y and 15z, respectively. The second ends of the dummy optical fibers are connected to the three optical fibers which extend from the rotor 1 at the through-holes 15a, respectively, while the first ends of the dummy optical fibers extend to coupling bobbins 18x, 18y and 18z upon which the dummy optical fibers are partially wound. The first ends are then inserted into through-holes 18a formed on the coupling bobbins.

The coupling bobbins 18x, 18y and 18z are rotatably mounted on rotary shafts 4x, 4y and 4z which are independent from the rotary shafts 4. Rotary joints 5x, 5y and 5z are provided at first ends of the rotary shafts 4x, 4y and 4z, respectively, and sliding joints 19x, 19y and 19z are provided at the other ends of the rotary shafts 4x, 4y and 4z, respectively. Driven pulleys 20x, 20y and 20z are coupled to the sliding joints 19x, 19y and 19z and are further coupled to the aforementioned pulleys 16x, 16y and 16z through belts 21x, 21y and 21z, respectively.

First ends of optical fibers 9x, 9y and 9z are connected to the closed-end cylinders 7x, 7y and 7z of the rotary joints 5x, 5y and 5z, respectively, while the second ends thereof are connected to stationary terminal units 8x, 8y and 8z, respectively. The dummy fibers 17x, 17y and 17z extend to the through-holes 18a of the coupling bobbins 18x, 18y and 18z are further to the rotary joints 5x, 5y and 5z through the rotary shafts 4x, 4y and 4z and are coupled to the optical fibers 9x, 9y and 9z, respectively.

As described above, the five-core optical cable 2 connected to the seabed sensor 3 is wound on the rotor 1 from which it is branched into five optical fibers 2a. Two of the optical fibers 2a extend to the rotary joints 5a and 5b. The remaining three optical fibers are coupled to the dummy fibers 17x, 17y and 17z through the dummy bobbins 15, 15y and 15z, respectively. The dummy fibers 17x, 17y and 17z are wound on the coupling bobbins 18x, 18y and 18z and extend to the rotary joints 5x, 5y and 5z. Thus, the five optical fibers 2a are coupled through the rotary joints 5a, 5b, 5x, 5y and 5z and the optical fibers 9a, 9b, 9x, 9y and 9z to the stationary terminal units 8a, 8b, 8x, 8y and 8z, respectively.

As the rotor 1 is rotated, the optical cable 2 connected to the seabed sensor 3 is wound or unwound. In this operation, the optical fibers 2a in the rotor 1 are smoothly rotated with the rotor 1 while simultaneously the dummy fibers 17x, 17y and 17z on the coupling bobbins 18x, 18y and 18z are rotated together with the coupling bobbins 18x, 18y and 18x with the dummy fibers 17x, 17y and 17z being wound on the dummy bobbins 15x, 15y and 15z or the coupling bobbins 18x, 18y and 18z according to the direction of rotation of the rotor 1. Accordingly, the optical fibers 2a and the dummy fibers 17x, 17y and 17z are never twisted.

In the above-described embodiment, the optical fibers 2a and the dummy fibers 17x, 17y and 17z are provided separately. However, the dummy fibers can be eliminated if the optical fibers 2a are further extended so that they are wound on the dummy bobbins 15x, 15y and 15z and on the coupling bobbins 18x, 18y and 18z. The winding direction of the dummy fibers 17x, 17y and 17z wound on the dummy bobbins 15x, 15y and 15z may be the same as or opposite to that of the optical cable 2 wound on the rotor 1. In the case they are wound in the same direction, as the optical cable is played out from the rotor 1, the dummy fibers 17x, 17y and 17z are unwound from the dummy bobbins 15x, 15y and 15z. In the case the opposite winding direction is used, as the optical cable is played out from the rotor 1, the dummy fibers 7x, 7y and 7z are taken up on the dummy bobbins 15x, 15y and 15z.

The length L of each of the dummy fibers 17x, 17y and 17z wound on the dummy bobbins 15x, 15y and 15z is set to satisfy the following equation or longer: $L = ld/D$ where l is the length of the optical cable 2 wound on the rotor 1, D is the effective diameter of the rotor 1, and d is the effective diameter of each of the dummy bobbins 18x, 18y and 18z. In this case, even if the optical cable 2 of the rotor 1 is completely played out, some of the dummy fibers 17x, 17y and 17z remain on the dummy bobbins 15x, 15y and 15z and therefore the potential difficulty that the lengths of the dummy fibers 17x, 17y and 17z may be insufficient never arises.

In driving the dummy bobbins 15x, 15y and 15z and the coupling bobbins 18x, 18y and 18z, the dummy bobbins 15x, 15y and 15z are rotated with the rotor 1 and as the pulleys 16x, 16y and 16z mounted on the rotary shaft 4 are rotated, the driven pulleys 20x, 20y and 20z are rotated through the belts 21x, 21y and 21z to thereby rotate the coupling bobbins 18x, 18y and 18z. The speed of each of the driven pulleys 20x, 20y and 20z is slightly higher than that of each of the coupling bobbins 18x, 18y and 18z. The difference in speed between the coupling bobbins 18x, 18y and 18z and the driven pulleys 20x, 20y and 20z is compensated for by the sliding effect of the sliding joints 19x, 19y and 19z, and the dummy fibers 17x, 17y and 17z unwound from the dummy bobbins 15x, 15y and 15z are wound on the coupling bobbins 18x, 18y and 18z with the aid of tension generated by the sliding torques. When the dummy fibers 17x, 17y and 17z are wound from the coupling bobbins 18x, 18y and 18z to the dummy bobbins 15x, 15y and 15z, the sliding joints 19x, 19y and 19z are disconnected and the tension produced by the rotational torques of the coupling bobbins 18x, 18y and 18z is not utilized. If, in the latter case, brakes are provided for the coupling bobbins 18x, 18y and 18z, operational control will be improved.

In the above-described embodiment, the rotary shafts 4x, 4y and 4z are driven by the torque of the rotary shaft 4. However, it should be noted that the invention is not limited thereto or thereby. That is, the rotary shafts 4x through 4z can be driven by other drive systems.

FIG. 5 shows the optical coupling arrangement of one of the optical fibers in the optical cable 2. An optical cable 2 whose first end is connected to the movable unit 3 is wound on the rotor 1. The second end of the optical cable 2 extends through the interior of the rotary shaft 4 and a first one of the optical fibers of the optical cable 2 is introduced to the surface of the winding barrel of the dummy bobbin 15z through a through-hole 15a formed in the dummy bobbin 15z. One end portion of the dummy fiber 17z is wound on the dummy bobbin 15z and the other end portion of the dummy fiber 17z on the coupling bobbin 18z. The first end of the dummy fiber 17z on the dummy bobbin 15z is coupled to the end of the first optical fiber of the optical cable 2. With this construction, according to the invention, the stationary terminal units 8a, 8b, 8x, 8y and 8z can be effectively and easily connected to the seabed sensor 3.

A modification of the above-described embodiment of an optical coupling device is shown in FIG. 6. In the modification, the rotary shafts 4 are bent in the form of cranks to couple the dummy bobbin 15x to the dummy bobbin 15y and to couple the dummy bobbin 15y to the dummy bobbin 15z therethrough.

The dummy fibers 17x, 17y and 17z, and the optical cable 2 are wound in and out while being wound on the dummy bobbins 15x, 15y and 15z and the coupling bobbins 18x, 18y and 18z, and the rotor 1, respectively. Therefore, it is necessary that the optical fibers, the optical cable and their sheaths be relatively high in mechanical strength.

As is clear from the above description, according to the invention, the optical coupling of a multi-core optical cable between the movable element and the stationary terminal units is suitably achieved. Furthermore, the size of the optical coupling device can be reduced by setting the size of the dummy bobbins and the coupling bobbins appropriately in conformance with the aforementioned ratio d/D.

Therefore, a second embodiment of an optical coupling device according to the invention will be described with reference to FIG. 7 in which those components which have been previously described with reference to the first embodiment are therefore numbered.

Figures 7, 9:
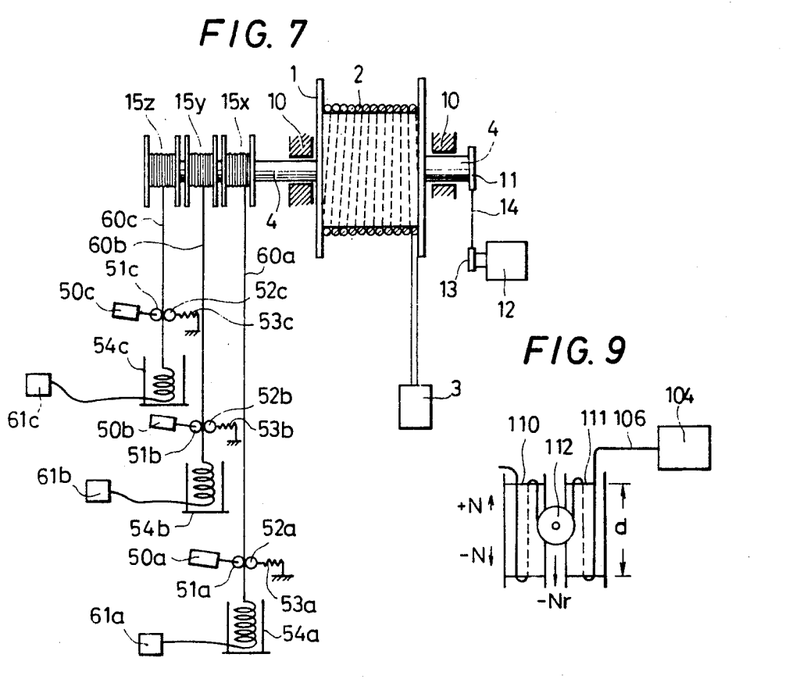
FIG. 7 is a schematic illustration showing an arrangement of an optical coupling device according to a second embodiment of the present invention.
FIG. 9 is an explanatory illustration for a description of the principle of the device in FIG. 8.

In FIG. 7, the mechanism including the rotor 1 and the three dummy bobbins 15x, 15y and 15z and the components therebetween is the same as that in FIG. 4. Dummy fibers 60a, 60b and 60c wound on the dummy bobbins 15x, 15y and 15z are each a single optical fiber or an optical fiber bundle formed by assembling several strands of optical fibers. The optical fibers in the optical cable 2 are divided at the second ends thereof into individual optical fibers or bundles of optical fibers depending on the numbers of optical fibers connected to stationary terminal units 61a, 61b and 61c and the individual optical fibers or the bundles of optical fibers are extended to the dummy bobbins 15x, 15y and 15z fixedly mounted on the rotary shaft 4 of the rotor 1, respectively. Accordingly, the dummy fibers 60a, 60b and 60c, the number of which are equal to the numbers of optical fibers connected to the stationary terminal units, are wound on the dummy bobbins 15x, 15y and 15z. The second ends of the dummy fibers 60a, 60b and 60c are coupled directly to the second ends of the optical fibers in the optical cable 2.

In FIG. 7, reference characters 54a, 54b and 54c designate bundle receiving devices which are positioned away from the dummy bobbins 15x, 15y and 15z or disposed at positions away from the positions of the rotary shaft 4. The first ends of the dummy fibers 60a, 60b and 60c extend through pinch rollers 51a and 52a, 51b and 52b, and 51c and 52c to the bundle receiving devices 54a, 54b and 54c, respectively. The second ends of the dummy fibers are pulled out of the lower portions of the bundle receiving devices 54a, 54b and 54c and are then connected to the stationary terminal units 61a, 61b and 61c, respectively. The stationary terminal units 61a, 61b and 61c may be of a single optical fiber type or of a multiple optical fiber type.

The bundle receiving devices 54a, 54b and 54c are adapted to receive the dummy fibers 60a, 60b and 60c unwound from the dummy bobbins 15x, 15y and 15z. The bundle receiving device may be simple containers such as stationary cylinders or may be such containers equipped with winding guides such as rotary arms (not shown) so that they dummy fibers 60a, 60b and 60c can be readily received therein.

The pinch rollers 52a, 52b and 52c depress the dummy fibers 60a, 60b and 60c with force supplied by springs 53a, 53b and 53c, respectively. The other pinch rollers 51a, 51b and 51c are driven by respective tensioning devices 50a, 50b and 50c constituted by electric motors with slip clutches. The pairs of pinch rollers 51a and 52a, 51b and 52b and 51c and 52c clamp the dummy fibers 60a, 60b and 60c, respectively. The pinch rollers 51a, 51b and 51c and 52a, 52b and 52c apply a predetermined tension to the dummy fibers 60a, 60b and 60c to pull the latter out of the dummy bobbins 16x, 16y and 16z at all times.

The tensioning devices 50a, 50b and 50c are preferably constituted by electric motors and slip clutches as described above. However, other various tensioning devices may be employed. For instance, tensioning devices which are driven through belts and gears by the rotor 1 and have slip clutches in the power transmission paths may be employed.

The operation of the above-described optical coupling device of the invention is as follows.

As the dummy fibers 60a, 60b and 60c are wound out from the dummy bobbins 16x, 16y and 16z, they are pushed into the bundle receiving devices 54a, 54b and 54c by the tension applied thereto by the pinch rollers 51a, 51b and 51c and 52a, 52b and 52c, respectively. When the rotor 1 is rotated in the opposite direction, the dummy fibers 60a, 60b and 60c are wound on the dummy bobbins 16x, 16y and 16z by a winding force which is produced against the tension provided by the pinch rollers 51a, 51b and 51c and 52a, 52b and 52c. When the dummy fibers 60a, 60b and 60c unwound from the dummy bobbins 16x, 16y and 16z are coiled in the bundle receiving devices 54a, 54b and 54c there is some tendency for them to be twisted. However, if the relationships between the diameter of each of the dummy bobbins 16x, 16y and 16z and the diameter of each of the bundle receiving devices 54a, 54b and 54c is suitably selected, then the amount of twisting can be limited to less than the breakage twisting stress of each of the dummy fibers 60a, 60b and 60c. Since the tension is continuously applied to the dummy fibers 60a, 60b and 60c by the pinch rollers 51a, 51b and 51c and 52a, 52b and 52c, the dummy fibers will not be kinked and can be wound tightly on the dummy bobbins 16x, 16y and 16z.

The optical coupling device according to the second embodiment of the invention is advantageous in the following points.

The dummy fibers 60a, 60b and 60c pulled out of the bundle receiving devices 54a, 54b and 54c are not rotated. Therefore, the dummy fibers can be coupled directly to the stationary terminal units 61a, 61b and 61c such as measuring instruments or control units using conventional connectors without rotary joints. Therefore, the optical coupling device is simple in construction and the reliability of the optical coupling parts is considerably improved. Since no rotary joints are required, the dummy fibers 60a, 60b and 60c are not limited to the above-described conventional single fibers 17x, 17y and 17z. That is, multi-core optical fibers can be used as the dummy fibers. For the same reasons, the stationary terminal units 61a, 61b and 61c are not limited to the use of single-core optical fibers. That is, stationary terminal units of multi-core optical fiber type may be used with the optical coupling device of this embodiment of the invention. Therefore, even in the case of a multi-core optical cable, the number of dummy bobbins is remarkably reduced when compared with the number of cores in the optical cable by employing bundles of optical fibers as the dummy fibers 60a, 60b and 60c. In other words, even if the number of optical fibers in the optical cable 2 is extremely large, the optical coupling device of the invention needs only a small number of dummy bobbins. Thus, the optical coupling device can be manufactured as a compact unit. Thus, as is believed clear from the above description, the optical coupling device according to the invention has a high reliability in optical coupling and is simple in construction and small in size.

The present invention further relates to a novel connecting system for connecting an electrical cable 102 which may be wound around or released from a drum to an external main electric device 104 without employing slip ring contacts or the like. A preferred embodiment of this aspect of the invention is shown in FIG. 8.

Figure 8:
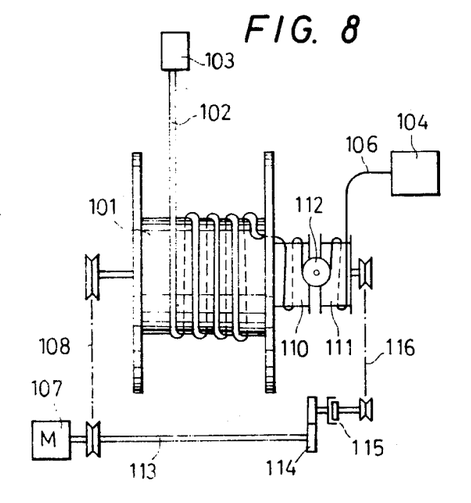
FIG. 8 is an explanatory illustration showing an example of a device for transmitting energy through a cable wound on a rotary drum between a movable unit and a stationary unit according to the present invention.

A device for transmitting electric energy to an electric wire or cable wound on a drum as shown in FIG. 8 includes a drum 101, a rotary reel 110 coaxially coupled directly to the drum 101, a stationary reel 111 adjacent to the rotary reel 110 with the stationary reel 111 being disposed separately from but coaxially with the rotary reel 110, and an intermediate guide 112 in the form of a roller disposed between the flanges of the reels 110 and 111 wherein the intermediate guide 112 is rotated only in one direction at all times. A lead cable 106 is wound on both of the reels 110 and 111.

The intermediate guide 112 which is rotated only in a single direction at all times is provided with a mechanism which allows the guide 112 to slide in the opposite direction with a suitable tension. That is, it is provided with a clutch 115 in its drive system (elements 113 through 116). The lead cable 106 passes freely around the guide 112 and is wound on the two reels 110 and 111 in the opposite direction by means of the intermediate guide 112. Thus, the end of the lead cable 106 wound on the stationary reel 111 does not rotate and therefore it can be connected directly to the main electric unit 104. On the other hand, the end of the lead cable 106 wound on the reel 110 is rotated with the drum 101 and therefore it can be connected to the end of the cable 102 on the drum 101.

It is preferable that the diameter of the winding barrels of the reels 110 and 111 be larger than that of the winding barrel of the drum 101 on which the cable 102 is wound. The winding length of the lead cable 106 should be made longer than that of the cable 102 in proportion to the barrel diameter ratio. The drum is driven through a drive device 108 by an electric motor 107 similarly to a conventional device. In combination with this, a drive mechanism for rotating the intermediate guide 112 between the reels 110 and 111 of the lead cable 106 is provided according to a specific feature of the invention.

An example of the drive mechanism will be described with reference to FIG. 8. The output power of the motor 107 is transmitted through a drive shaft 113, a drive direction switching device 114, a clutch 115 which is loosely engaged with the intermediate guide 112 so that it can slip in a direction opposite to the direction of rotation of the intermediate guide 112, an intermediate guide drive transmission device 116 and the central shaft of the stationary reel 111 to the intermediate guide 112 so as to rotate the intermediate guide 112 between the flanges of the reels 110 and 111.

When the cable 102 is played out from the drum or wound on the drum, the lead cable 106 is wound on the reels 110 and 111 as shown in FIG. 9. The lead cable 106 coupled directly to the cable 102 wound on the drum 101 is wound on the reel 110 connected directly to the drum while the same lead cable 106 is wound on the stationary reel 111 in the opposite direction.

When the drum 101 makes N revolutions in one direction to play out the cable 102, the lead cable 106 is wound on the reel 110 by a length $\pi dN$ (where d is the diameter of the winding barrel of the reel 110) while the lead cable 106 is played out from the reel 111 by the length $\pi dN$. While a length $\pi dN$ of the lead cable 106 is shifted from the reel 111 to the reel 110, the intermediate guide 112 is moved in a direction opposite to the aforementioned direction to take up slack in the cable 106. As a result, the lead cable 106 is wound on both of the reels 110 and 111 under tension. In this case, a length $\pi dN/2$ of the lead cable shifted from the reel 111 to the reel 110 passes through the intermediate guide 112. Therefore, the difference ($-n$) between the number of revolutions in the opposite direction of the intermediate guide 112 and the number of revolutions $+N$ of the reel 110 is:

$$-n = -\frac{\pi dN/2}{\pi d} = -N/2.$$

Therefore, the number of revolutions (Nr) of the intermediate guide 112 is:

$$Nr = +N - N/2 = +N/2.$$

The intermediate guide 112 is rotated in the same direction as the drum 101.

When, on the other hand, the drum 101 makes N revolutions in the opposite direction to rewind the cable 102 and a length $\pi dN$ of the lead cable wound on the reel 110 is unwound. Therefore, a half of the length $\pi dN$ must be shifted from the reel 110 to the reel 111 while the remaining length $\pi dN/2$ must be wound on the reel 110. Accordingly, it is necessary to rotate the intermediate guide 112 at a speed which is faster by as much as $-n = -\pi dN/2/\pi d = -N/2$ than a speed corresponding to the number of revolutions ($-N$) of the drum 101 or the reel 110. Thus, the intermediate guide should be turned at a speed corresponding to $Nr = -N - N/2 = -3N/2$.

As is apparent from the above description, the cable 102 can be played out and wound in with the cable 102 connected to the lead cable 106.

The ratio of the length L of the cable 102 to the length l of the lead cable 106 is substantially proportional to the ratio of the diameter D of the winding barrel of the drum 101 to the diameter d of the winding barrel of each of the reels 110 and 111, that is: $L/l = D/d$. Therefore, the length of the lead cable can be reduced by decreasing the diameter d of the reels 110 and 111. This is considerably effective in practical use.

Figure 10:
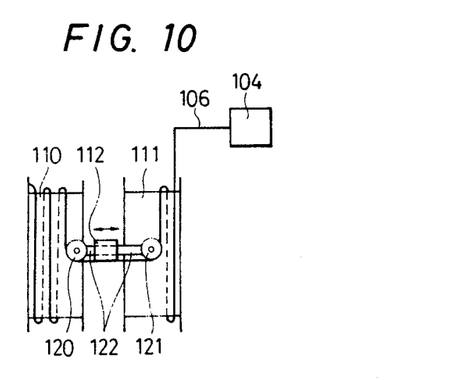
FIG. 10 is an explanatory illustration showing another example of a device for transmitting energy according to the present invention.

In the case where the lead cable 106 is considerably long, it is preferable that the lead cable 106 be wound regularly on the reels 110 and 111. For this purpose, a technique may be employed in which, as shown in FIG. 10, a support 122 supporting rollers 120 and 121 is moved horizontally in association with the rotation of the intermediate guide 112.

Figure 11:
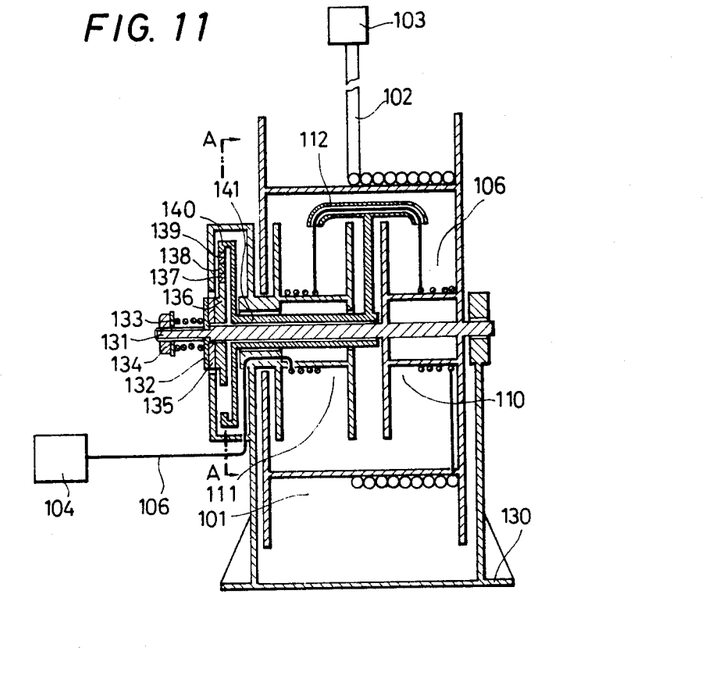
FIG. 11 is a cross-sectional view showing a device for transmitting energy incorporating the concept illustrated in FIGS. 8 and 9.
Figure 12A:
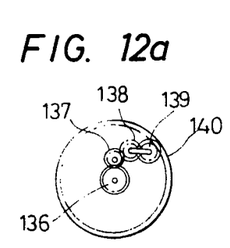
FIGS. 12(a) and 12(b) are cross-sectional views taken along the line A—A in FIG. 11 showing gear transmission means employed in the device of FIG. 11.
Figure 12B:
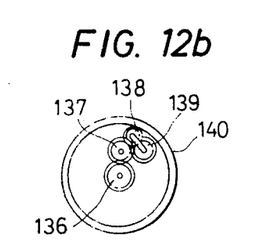

FIGS. 11 to 12(b) show a device for providing electrical energy transmission between an external electrical unit and a cable wound around or released from a drum utilizing the concept described with reference to FIGS. 8 to 10. In the drawings, a stationary reel 111 and a rotary reel 110 is incorporated in a drum 101 and a mechanism is provided for driving an intermediate guide 112 in a predetermined direction in response to the rotation of the drum 101. The device as shown in FIG. 11 is of small portable type. The cable 102 can be played out and wound in by manually rotating the drum 101. A technique for winding a lead cable 106 on the reels 110 and 111 and the operation of the intermediate guide 112 are similar to those described with reference to FIG. 8.

A specific feature of the arrangement shown in FIG. 11 resides in that the rotation of the drum 101 is transmitted through a frictional mechanism (132, 135 and 136) and a drive conversion device (136 through 140) to the intermediate guide 112 so that the intermediate guide 112 is moved in a predetermined direction and is turned suitably irrespective of the direction of rotation of the drum 101. This operation and structure will be described in more detail below.

A washer 132 is fitted on a shaft 131 which is connected directly to the rotary drum 101. The washer 132 is suitably depressed by a spring 133 so that the washer 132 is rotated with the shaft 131. The depression force applied to the washer can be appropriately adjusted by turning a nut 134. The washer 132 is in contact with a brake plate and gear 136 through a multi-plate type disc brake 135 so as to apply a suitable frictional force to the gear 136 to turn the gear 136. The rotation of the gear 136 is transmitted through a group of gears 137, 138 and 139 to an internal gear 140 which is engaged with the drive shaft 141 of the intermediate guide whereby the drive shaft 141 is turned.

In the example shown in FIG. 11, the direction of drive of the intermediate guide 112 is maintained unchanged by means of the group of drive gears 136 through 140 irrespective of the direction of rotation of the drum 101. For this purpose, the directions of rotation of the gear 136 and 140 are reversed by employing a technique with which the gears 138 and 139 which are maintained in engagement with each other are engaged with the gear 137 and the gear 140 respectively, as shown in FIG. 12(a) or a technique with which only the gear 38 is engaged with the gears 137 and 140 as shown in FIG. 12(b).

It is preferable that the lead cable 106 be sufficiently flexible that its characteristics do not change when it is played out from the reels 110 and 111 or wound on the latter.

In the case where the cable 102 is used for optical transmission, a system may be employed in which an electrical transmission lead cable is employed as the lead cable 106 extending to the drum and optical energy is converted into electrical energy by a converter provided on the drum and vice versa. With the device of the invention, the lead cable wound on the reels 110 and 111 can be automatically wound in and played out by the intermediate guide. Therefore, it is unnecessary to interpose a rotary slide contactor between the electric wire or cable wound on the drum and the lead cable. That is, the cable on the drum can be connected directly to the lead cable. Thus, the device of the invention is suitable especially for high frequency signal transmission or optical transmission.

Figure 13:
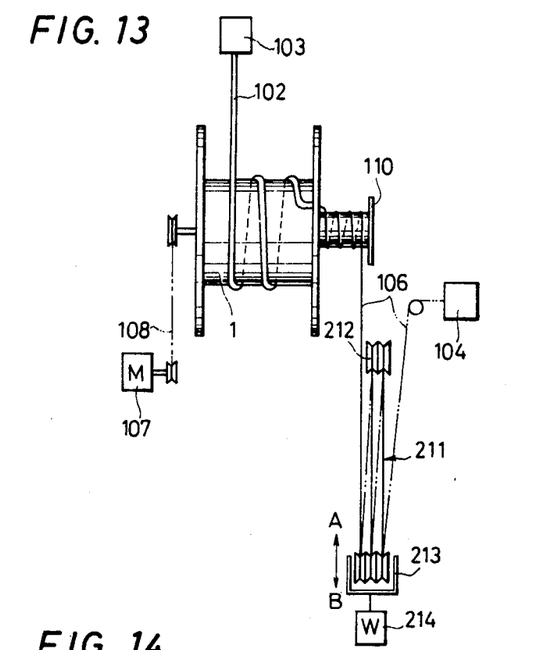
FIG. 13 is a schematic illustration showing a device for transmitting energy according to a third embodiment of the present invention.
Figure 14:
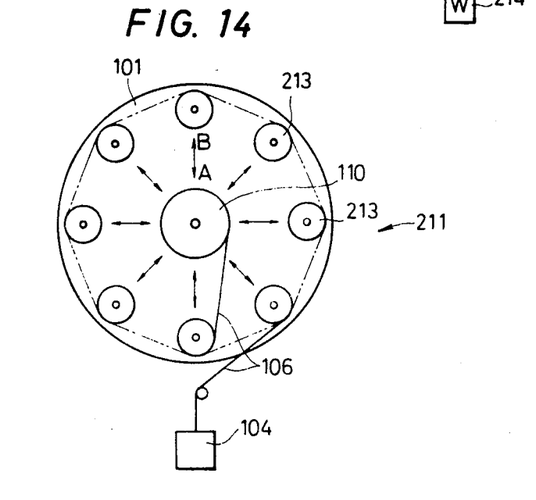
FIG. 14 is a schematic illustration showing a part of a device for transmitting energy according to a fourth embodiment of the present invention.

FIGS. 13 and 14 show still further embodiments for transmitting energy between an external main electrical unit and a cable wound around or released from a drum. According to the embodiment shown in FIG. 13, only a lead cable 106 is used to connect a cable which is played out from a drum 101 or wound on the drum to an external main electric device 104 without requiring the use of slip ring contacts or the like.

The lead cable 106 is wound on a reel 110 which is coaxially connected to one end of the drum 101. The lead cable 106 is connected to the cable 102 which is wound in and played out from the drum 101. When the lead cable 106 is being wound in or played out from the reel 110, the number of revolutions or the number of turns of the lead cable 106 is equal to that of the cable 102 on the drum 101. Therefore, if the diameter of the winding barrel of the reel 110 is made smaller than that of the winding barrel of the drum 101, then the wound-in or played-out length of the lead cable 106 can be made much shorter than that of the cable 101. That is, it can be reduced in proportion to the winding barrel diameter ratio.

When the main cable 101 is played out, the lead cable 106 is wound in and when the main cable 101 is wound in, the lead cable 106 is played out. In this connection, the length of the lead cable 106 which is played out must be received by a suitable device. For this purpose, a cable storing device 211 is provided. The cable storing device 211 is constituted by stationary pulleys 212 and a movable pulley 213. When the lead cable 106 is wound on the reel 110, the movable pulley 213 is moved toward the stationary pulley 212 in the direction of the arrow A to feed the lead cable to the reel 110. On the other hand, when the lead cable is played out from the reel 110, the movable pulley 213 is moved away from the stationary pulley 212 in the direction of the arrow B so that the length of the lead cable 106 which is played out is received by the cable storing device 211. The movable pulley 213 may be moved by using, for instance, a weight 214 to give predetermined tension to the movable pulley 213 or by pulling the movable pulley 213 with a torque motor. The cable storing device 211 may be extended either horizontally or vertically.

Alternatively, a number of movable guide wheels 213 may be arranged along the circumference of the reel 110 as shown in FIG. 14 in such a manner that they move in the directions of the arrows A or B as the lead cable is wound in or played out from the reel 101. In other words, in this case, the movable guide wheels 213 are moved radially inwardly in the directions of arrows A when the lead cable 106 is wound on the reel 110 and the movable guide wheels are moved radially outwardly in the direction of arrows B when the lead cable 106 is played out from the reel 110 so that the lead cable 106 is effectively stored.

As is clear from the above description, with the device according to the invention, the lead cable can be completely connected to an electric wire or cable wound on the drum without using a rotary slide contractor. Therefore, the device of the invention is quite suitable for high frequency signal transmission or optical transmission.

What is claimed is:

1. A device for transmitting signals between a movable unit and a plurality of stationary units, comprising:
    a multi-core cable, each core of said multi-core cable having a first end connected to said movable unit;
    a rotor for winding said multi-core cable therearound;
    at least one dummy bobbin;
    means for coaxially mounting said at least one dummy bobbin with said rotor so as to be integrally rotatable therewith;
    at least one dummy cable wound around said at least one dummy bobbin, a first end of said at least one dummy cable being connected to a second end of one of said multi-core cable cores, a second end of said at least one dummy cable being connected to one of said stationary terminal units; and
    at least one dummy cable storing device arranged between said at least one dummy bobbin and said one of said stationary terminal units for storing said at least one dummy cable as said rotor is rotated.

2. The device of claim 1 wherein said multi-core cable comprises a multi-core optical fiber cable having a plurality of optical fibers, a first end of each of said optical fibers being connected to said movable unit, a second end of each of said optical fibers being introduced into said rotor, at least one of said optical fibers having said second end thereof connected to said at least one dummy cable which is wound on said at least one dummy bobbin;

said at least one dummy cable storing device comprising a coupling bobbin;

a shaft for mounting said coupling bobbin, said second end of said at least one dummy cable being introduced into said coupling bobbin; and said mounting means comprising a second shaft for mounting said at least one dummy bobbin and said rotor integrally together and separately from said shaft of said coupling bobbin.

3. The device of claim 1, wherein said dummy cable storing device comprises a bundle receiving device and further comprising at least one pinch roller interposed between said bundle storing device and said dummy bobbin to impart tension on said dummy cable to pull said dummy cable away from said dummy bobbin.

4. A device for transmitting signals between a multi-core optical cable and stationary terminal units corresponding to each core of said multi-core optical cable comprising:

a rotatable drum rotatably mounted upon rotary shafts;

a multi-core optical cable adapted to be wound upon said drum, one end of said optical cable being disposed through a through-hole in said drum, at least one of said rotary shafts being hollow;

at least one rotary joint coupled to at least one of said rotary shaft, one core of said multi-core cable being operationally coupled through said rotary joint to a first stationary terminal unit;

a plurality of dummy bobbins mounted upon and rotating with at least one of said rotary shafts;

a plurality of coupling bobbins, one of said coupling bobbins being provided for each of said dummy bobbins, each of said coupling bobbins being mounted upon a corresponding rotary shaft;

a plurality of dummy fibers, one of said dummy fibers being provided for each pair of said dummy bobbins and said coupling bobbins, each of said dummy fibers having a first end disposed through a through-hole in its corresponding dummy bobbin and being coupled to a corresponding core of said multi-core cable, each of said dummy fibers being adapted to be wound upon a corresponding dummy bobbin and coupling bobbin;

means for rotating said coupling bobbins in response to rotation of said rotary shafts;

a plurality of second rotary joints, one of said second rotary joints being provided at the end of each of said shafts upon which said coupling bobbins are mounted, each of said dummy fibers having a second end disposed through a through-hole in its corresponding coupling bobbin and being coupled to the corresponding rotary joint, each of said rotary joints being coupled at the end thereof away from said coupling bobbins to corresponding stationary units.

5. The device of claim 4 wherein a rotary joint is provided at an end of each of said rotary shafts upon which said drum is mounted with a corresponding core of said multi-core cable being coupled thereto.

6. The device of claim 5 wherein said means for rotating said shafts upon which said coupling bobbins are mounted comprises a first set of pulleys, one pulley of said first set of pulleys being provided for each of said dummy bobbins; a second set of pulleys, one pulley of said second set of pulleys being provided for each of said coupling bobbins and being mounted to rotate a corresponding rotary shaft upon which the corresponding coupling bobbin is mounted; and a plurality of belt means, one of said belt means extending between each pulley of said first set of pulleys and a corresponding pulley of said second set of pulleys.

7. The device of claim 4 wherein the rotary shaft upon which said dummy bobbins are mounted is bent in a crank shape.

8. The device of claim 4 wherein said dummy fibers are extensions of cores of said multi-core cable.

9. A device for transmitting signals between a multi-core optical cable and stationary terminal units corresponding to each core of said multi-core optical cable comprising:

a drum;

a rotary shaft, said drum being mounted on said rotary shaft to rotate therewith;

a multi-core cable adapted to be wound upon said drum, said multi-core cable having one end thereof extending through a through-hole in said drum;

a plurality of dummy bobbins mounted upon said rotary shaft and rotated therewith;

a plurality of dummy fibers, one of said dummy bobbins being provided for and wound upon corresponding ones of said dummy bobbins, each of said dummy fibers being coupled to a corresponding core of said multi-core cable;

a plurality of tensioning devices, one of said tensioning devices being provided for each of said dummy fibers;

a plurality of bundle receiving units, one of said bundle receiving units being provided to receive each of said fibers unwound from a corresponding dummy bobbin, said tensioning devices providing tension to the corresponding fibers between said dummy bobbins and said bundle receiving units.

10. The device of claim 9 wherein said tensioning devices each comprises a punch roller in contact with a corresponding dummy fiber and a motor unit for driving said pinch roller.

11. The device of claim 9, further comprising at least one rotary joint operationally coupled to said rotary shaft, at least one core of said multi-core cable being operationally coupled through said rotary joint to a corresponding stationary unit.

* * * * *